United States Patent
Shimada et al.

(10) Patent No.: US 6,226,064 B1
(45) Date of Patent: May 1, 2001

(54) LIQUID CRYSTAL DISPLAY APPARATUS HAVING A NEGATIVE DIELECTRIC CONSTANT ANISOTROPY AND A PHASE DIFFERENCE PLATE

(75) Inventors: Shinji Shimada, Kashihara; Hiroshi Yoshikawa, Onoda, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/164,172

(22) Filed: Sep. 30, 1998

(30) Foreign Application Priority Data

Sep. 30, 1997 (JP) .................................................. 9-266135

(51) Int. Cl.$^7$ .................................................. G02F 1/1335
(52) U.S. Cl. .................................................. 349/117
(58) Field of Search .................................. 349/117, 118, 349/119

(56) References Cited

U.S. PATENT DOCUMENTS

| | | | |
|---|---|---|---|
| 4,357,374 | * 11/1982 | Ogawa ..................................... | 428/1 |
| 4,701,028 | * 10/1987 | Clerc et al. ........................... | 350/337 |
| 4,889,412 | * 12/1989 | Clerc et al. ........................... | 350/347 |
| 5,179,456 | * 1/1993 | Aizawa et al. ......................... | 359/73 |
| 5,298,199 | * 3/1994 | Hirose et al. .......................... | 359/73 |
| 5,473,455 | * 12/1995 | Koike et al. ............................ | 359/76 |
| 5,543,948 | * 8/1996 | Takahashi et al. ..................... | 359/73 |
| 5,589,965 | * 12/1996 | Bahadur et al. ....................... | 349/165 |

FOREIGN PATENT DOCUMENTS 6-337421   12/1994   (JP) .
9-133913    5/1997   (JP) .

* cited by examiner

*Primary Examiner*—Kenneth Parker
(74) *Attorney, Agent, or Firm*—Dike, Bronstein, Roberts & Cushman, LLP; David G. Conlin; William J. Daley, Jr.

(57) ABSTRACT

It is an object of the invention to provide a liquid crystal display apparatus produced by combining a negative dielectric constant anisotropy and a perpendicular orientation film, the apparatus capable of preventing lowering of contrast because of a phase difference due to a tilt of liquid crystal molecules at the time of non-select voltage application and ensuring both high luminance and high contrast. The liquid crystal display apparatus produced by combining the negative dielectric constant anisotropy and the perpendicular orientation film is used in the normally black mode, and a phase difference plate for compensating the phase difference caused by the tilt of the liquid crystal molecules at the time of non-select voltage application is provided so as to be adjacent to a liquid crystal cell, with the result that light-transmittance at the time of non-select voltage application can be kept in a low value and contrast can be largely improved.

8 Claims, 2 Drawing Sheets

LIQUID CRYSTAL DISPLAY APPARATUS HAVING A NEGATIVE DIELECTRIC CONSTANT ANISOTROPY AND A PHASE DIFFERENCE PLATE

BACKGROUND OF THE INVENTION

1. Field of the Invention

The present invention relates to a liquid crystal display apparatus, in particular to a liquid crystal display apparatus which is used as a display apparatus of direct-view-type or projection-type.

2. Description of the Related Art

A liquid crystal display apparatus has such s structure that liquid crystal molecules are sandwiched between two substrates on which electrodes are formed, and a predetermined voltage is applied to the electrodes to control orientation directions of liquid crystal molecules for display.

As liquid crystals used for such liquid crystal display apparatus there exist ones having a positive dielectric constant anisotropy and ones having a negative dielectric constant anisotropy.

In the case where the liquid crystal having a positive dielectric constant anisotropy (hereinafter referred to as P-type liquid crystal) is used, horizontal orientation films are formed on substrate faces where the electrodes are formed, so that the liquid crystal molecules are oriented substantially parallel to the substrate faces at the time of non-select voltage application between the electrodes.

On the other hand, in the case where the liquid crystal having a negative dielectric constant anisotropy (hereinafter referred to as N-type liquid crystal) is used, perpendicular orientation films are formed on the substrate faces where the electrodes are formed, so that the liquid crystal molecules are oriented substantially perpendicular to the substrate faces at the time of non-select voltage application between the electrodes.

Although the N-type liquid crystal is generally useful for widening of viewing angle and increasing of response speed as compared with the P-type liquid crystal, and in practical application to display apparatuses it has not been so widely used for the reasons of difficulty in obtaining stable perpendicular orientation, unavailability of N-type liquid crystal of high reliability, etc.

In recent years, however, a perpendicular orientation film using a polyimide type material is available and thereby stable perpendicular orientation is achieved, and furthermore a liquid crystal material containing fluorine as a functional group has come on the market to make the N-type liquid crystal of high reliability obtainable, so that the development of the liquid crystal display apparatus using the N-type liquid crystal has been increasingly pursued.

In general, in the case where the N-type liquid crystal is used, as a voltage is applied to the liquid crystal, the liquid crystal molecules tilt to be substantially parallel to the substrate surface. However, if the tilt directions of the liquid crystal molecules are not uniform, disclination occurs due to irregular orientation of the liquid crystal molecules, with the result that display quality is largely lowered.

In order to avoid such a problem, in the case where the N-type liquid crystal is used, the major axial direction of the liquid crystal molecules is conventionally caused to be slightly inclined from the normal direction of the substrate surface to form a tilt angle θ, at the time of non-select voltage application.

Here, the tilt angle θ is, as shown in FIG. 4, an angle formed by the major axial direction 33 of the liquid crystal molecules 32 with respect to the normal direction 31 of the substrate 30.

The prior art disclosed in Japanese Unexamined Patent Publication JP-A 6-337421 (1994) relates to a reflective-type liquid crystal display apparatus comprising a polarizer, a phase difference plate and a liquid crystal cell, which are arranged in this order. The liquid crystal cell is structured so that nematic liquid crystal molecules with a negative dielectric constant anisotropy are perpendicularly oriented and sandwiched between a pair of substrates. With respect to the liquid crystal molecules in vicinities of upper and lower substrates, the orientation directions of the liquid crystal molecules coincide with each other while the tilt angles thereof differ from each other. An optical axis of the phase difference plate is arranged in a direction intersecting at right angles with the orientation direction of the substrate disposed near the phase difference plate. A retardation value of the phase difference plate is selected in a range of 110 nm to 140 nm. The art disclosed in the Publication comprises a phase difference plate having a larger phase difference, whereby an improved viewing angle characteristic is attained.

Further, prior art disclosed in Japanese Unexamined Patent Publication JP-A 9-133913 (1997) also relates to a reflective-type liquid crystal display apparatus comprising a polarizer, a phase difference plate and a liquid crystal cell, which are arranged in this order, the apparatus further comprising at least one of light-diffusing means and light-gathering means, whereby an improved viewing angle characteristic is attained.

The projection-type liquid crystal display apparatus needs to have a panel of small size for miniaturizing the apparatus itself and reducing the cost for an optical system, for example. As the panel size becomes smaller, the definition of the liquid crystal display apparatus becomes higher, so that adjacent pixels becomes very proximate to each other. Therefore, there is a problem that a lateral electric field may be created among the adjacent pixel electrodes to newly cause orientation irregularity of the liquid crystal molecules, thereby causing a decrease in luminance.

With regard to the liquid crystal display apparatus using the N-type liquid crystal, a larger angle is often selected as the tilt angle θ in order to prevent the liquid crystal molecules from being irregularly oriented. However, in the case where a larger angle is selected as the tilt angle θ, there is a problem that a phase difference is generated due to the tilt of the liquid crystal molecules at the time of non-select voltage application, and light leakage is thereby caused and the liquid crystal display apparatus has significantly lowered contrast.

SUMMARY OF THE INVENTION

It is an object of the invention to provide a liquid crystal display apparatus using N-type liquid crystal of which luminance and contrast is prevented from being lowered.

The present invention provides a liquid crystal display apparatus comprising at least a liquid crystal cell in which liquid crystal molecules having a negative dielectric constant anisotropy are sandwiched between two electrode substrates which confront each other and each have a perpendicular orientation film on a surface thereof, a major axial direction of the liquid crystal molecules in a state of non-select voltage application between the electrodes being tilted toward a normal direction of the electrode substrates, a phase difference plate for compensating a phase difference generated due to the tilt of the liquid crystal molecules being disposed adjacent to the liquid crystal cell.

Further it is preferable in the invention that a phase difference of the phase difference plate is set to be one to four times the phase difference generated due to the tilt of the liquid crystal molecules.

Further it is preferable in the invention that a tilt angle θ formed by the major axial direction of the liquid crystal molecules in the state of non-select voltage application between the electrodes and the normal direction of the electrode substrates is set to be in a range of 1° to 15°.

Further it is preferable in the invention that the phase difference plate is made of norbornene resin.

According to the invention, since the liquid crystal display apparatus comprises the phase difference plate for compensating the phase difference due to the tilt angle θ of the liquid crystal molecules in non-select voltage application, it is possible to prevent lowering of contrast and to obtain both high luminance and high contrast.

Since the phase difference plate is required to compensate at least the phase difference generated due to the tilt angle θ, it is desirable that the phase difference of the phase difference plate is equal to or larger than the phase difference generated due to the tilt of the liquid crystal molecules.

In the case where the phase difference of the phase difference plate (hereinafter referred to as $R_{RE}$) is larger than the phase difference generated due to the tilt of the liquid crystal molecules (referred to as $R_{LC}$ hereinafter), the phase differences $R_{RE}$ and $R_{LC}$ are matched to each other by adjusting an angle formed by the tilt direction of the liquid crystal molecules in non-select voltage application and the direction of the phase axis of the phase difference plate. However, when a ratio of $R_{RE}$ to $R_{LC}$ is too large, the effect vastly drops due to a slight displacement of the angle. Therefore, it is desirable that the phase difference of the phase difference plate is four times the phase difference generated due to the tilt of the liquid crystal molecules or less.

Further, in the case where the tilt angle θ is too small, a direction where the liquid crystal molecules fall in voltage application is hard to determine, and when being too large, there occurs variation in the tilt angle θ. Therefore, it is desirable to set the tilt angle θ in a range of 1° to 15°.

Still more, it is desirable to use norbornene resin, which has an infinitesimal refractive index anisotropy, for the phase difference plate.

As explained above, the liquid crystal display apparatus of the invention comprises at least a liquid crystal cell in which liquid crystal molecules having a negative dielectric constant anisotropy are interposed between two electrode substrates on surfaces of which perpendicular orientation films are formed, wherein major axial directions of the liquid crystal molecules in a state of non-select voltage application between the electrodes are tilted toward a normal direction of the electrode substrates, and wherein a phase difference plate for compensating a phase difference generated due to the tilt of the liquid crystal molecules is disposed adjacent to the liquid crystal molecules. Accordingly, when the apparatus is used in the normally black mode, light-transmittance at the time of non-select voltage application can be restricted to an extremely low value, so that extensively improved contrast can be achieved.

Therefore, it is possible to provide a liquid crystal display apparatus of high luminance, high contrast and high display quality.

Further, the phase difference of the phase difference plate is set to be one to four times the phase difference generated due to the tilt of the liquid crystal molecules, so that the phase difference due to the tilt of the liquid crystal molecules at the time of non-select voltage application can be reliably compensated as well as a margin for placing the axis of the phase difference plate can be widely obtained.

Still more, the tilt angle θ formed by the major axial direction of the liquid crystal molecules in a state of non-select voltage application between the electrodes and the normal direction of the electrode substrate is set to be in the range of 1° to 15°, so that the direction where the liquid crystal molecules fall when a voltage is applied can be reliably aligned as well as variations can be prevented from caused in the tilt angle θ.

Therefore, the phase difference due to the tilt of the liquid crystal molecules can be uniformly aligned in the whole liquid crystal cell, so that high contrast can be obtained uniformly within the whole display region.

Moreover, by using the phase difference plate whose major constituent is norbornene resin, which has an infinitesimal refractive index anisotropy, a phase difference plate with a minute phase difference can be easily produced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
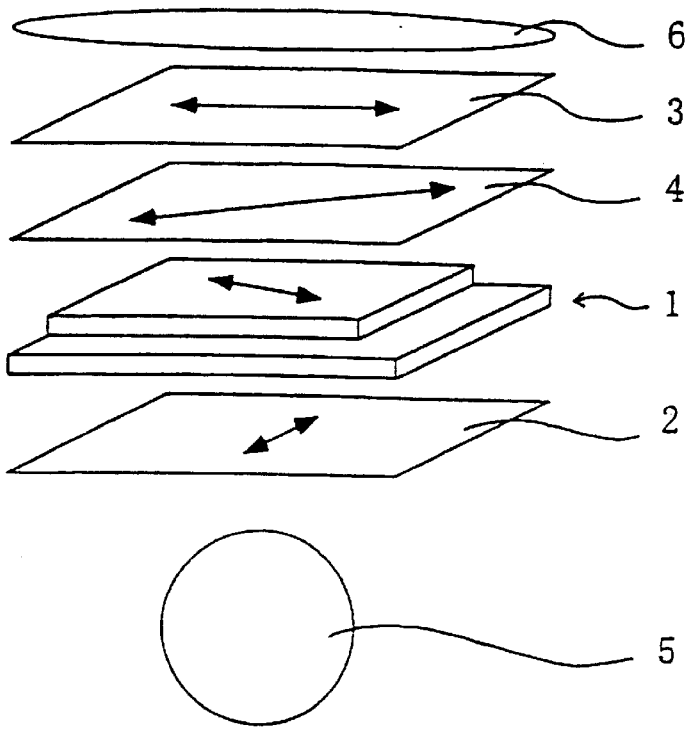
FIG. 1 is a perspective view showing a schematic structure of a liquid cry s display apparatus of an embodiment according to the invention.

Now referring to the drawings, preferred embodiments of the invention are described below.

Embodiments of the invention will be explained with respect to FIGS. 1 to 4 as follows. Although liquid crystal display apparatuses of projection-type are illustrated in the following embodiments, a liquid crystal display apparatus of direct-view -type also brings the same effect.

(First Embodiment)

FIG. 1 is a schematic view showing a structure of the liquid crystal display apparatus of a first embodiment, the apparatus comprising a liquid crystal cell 1 in which N-type liquid crystal molecules are sandwiched between two electrode substrates and a perpendicular orientation film is formed on an inner face of each electrode substrate; polarizers 2 and 3 which interpose the liquid crystal cell 1 and are arranged so that polarizing axes thereof intersect with each other at right angles; a phase difference plate 4 disposed between the liquid crystal cell 1 and the polarizer 3; a light source 5 disposed on a side opposite side to the liquid crystal cell 1 side of the polarizer 2; and a projection lens 6 disposed on a side opposite to the phase difference plate 4 side of the polarizer 3.

The liquid crystal display apparatus of the embodiment is of the normally black mode where black display is offered at the time of non-select voltage application, because the N-type liquid crystal is used and the polarizers 2 and 3 are arranged so that the polarizing axes thereof intersect with each other at right angles. In general, in order to improve the contrast of the liquid crystal display apparatus when the N-type liquid crystal is used, it is effective to keep the light-transmittance low at the time of black display. In order to realize that, it is better to adopt the normally black mode.

Next, the structure of the liquid crystal display apparatus shown in FIG. 1 will be explained below in detail.

The liquid crystal cell 1 is formed in such a manner that a TUFT substrate in which thin-film transistors (TFT) are formed in a matrix form, and a counter substrate in which a counter electrode and a color filter are formed are bonded to have a predetermined space from each other by a sealing member or a spacer, in which space the N-type liquid crystal is injected.

A method for manufacturing the TFT substrate will be illustrated below.

First, amorphous silicon is formed on a glass substrate in a form of island, which amorphous silicon is transformed into polysilicon by laser irradiation. Next, a gate insulating film made of silicon oxide is formed, and gate signal lines and gate electrodes made of Ta, Al or the like are subsequently formed.

After phosphorus or boron is implanted at a predetermined position by ion doping and activated by heat, another insulating film is formed, contact holes are formed, and then source signal lines, source electrodes and drain electrodes made of Ta, Al or the like are formed.

Still another insulating film is formed on a transistor array thus configured, contact holes are formed on the drain electrodes, and pixel electrodes are formed by use of indium tin oxide (ITO) at a predetermined position.

Moreover, a perpendicular orientation film is formed on the whole face of the substrate. For this perpendicular orientation substrate, polyimide, polyamide, poliamic acid, polysiloxane or the like, each of which includes a perpendicular orientation group, can be used. Further, as a method for applying such a material, spin coating, printing, dipping or the like can be adopted. Generally, after being applied, the material is baked to form the perpendicular orientation film. As another method for forming the perpendicular orientation film, there are a method using a material such as chromium complex, lecithin or the like to form the film and a method in which silicon oxide is evaporated on the skew can be adopted. In the embodiment, Sanever 783 (product name; made by Nissan Kagaku Kogyo Sha) containing polyamic acid as a major constituent was applied by spin coating, and partially transformed into polyimide by baking to form the perpendicular orientation film. The TFT substrate was thus produced.

The counter substrate is produced by forming the counter electrode of indium tin oxide (ITO) on the substrate to have a predetermined shape and further forming the perpendicular orientation film on the whole face of the substrate. The perpendicular orientation film can be formed in the same manner as the TFT substrate. Still more, a color filter may be additionally formed on the counter substrate.

An orientation treatment by rubbing is given to the TFT and counter substrates thus produced. At this moment, a tilt angle θ of liquid crystal molecules can be controlled by adjusting of rubbing intensity. The orientation treatment is given so that the rubbing directions to the substrates are different from each other by 180° when the substrates are bonded in a later process.

Then, plastic beads with a particle size of 4 μm were scattered onto one of the substrates to bond the two substrates, and the circumference thereof except for a hole for injecting liquid crystal was sealed by a sealing member. A cell thickness of the liquid crystal cell is regulated in accordance with the particle size of the plastic bead.

Figure 2:
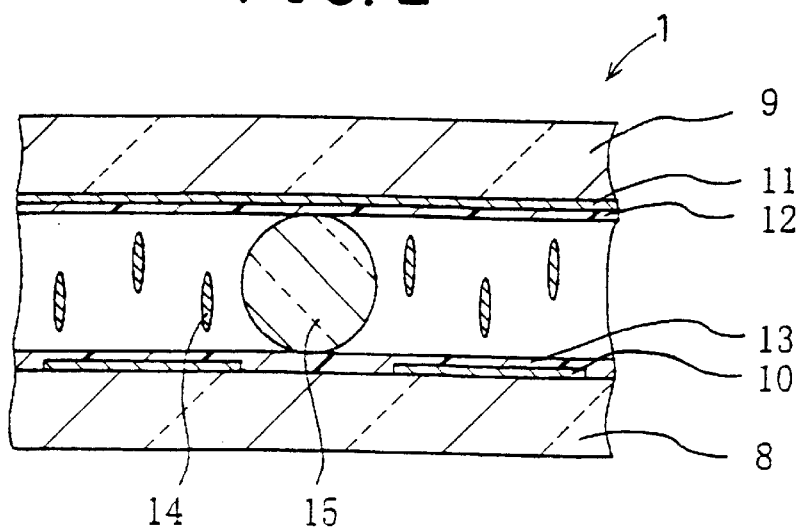
FIG. 2 is a section view showing a structure of a liquid crystal cell of the liquid crystal display apparatus.

Subsequently, the N-type liquid crystal is injected through the liquid crystal injection hole and the liquid crystal injection hole is sealed to produce the liquid crystal cell 1. A sectional view showing the structure of this liquid crystal cell 1 is shown by FIG. 2. In FIG. 2, the liquid crystal cell 1 comprises a TFT substrate 8, a counter substrate 9, pixel electrodes 10, a counter electrode 11, perpendicular orientation films 12 and 13, liquid crystal molecules 14 and plastic beads 15. Incidentally, an orientation state of the liquid crystal molecules 14 at the time of non-select voltage application is described in FIG. 2. Further, a description of a signal line, a TFT element, an insulating film and the like disposed on the TFT substrate 8 is omitted.

In the embodiment, MLC-2012 (product name; made by Merck Japan) having a refractive index anisotropy Δn of 0.0756 was used as the N-type liquid crystal.

A phase difference $R_{LC}$ due to the tilt of the liquid crystal molecules is expressed as follows, by use of:

$$R_{LC} = d \cdot \Delta n \cdot \sin \theta$$

wherein d is a cell thickness of the liquid crystal cell, Δn is a refractive index anisotropy of the liquid crystal molecules, and θ is a tilt angle.

Since the liquid crystal cell 1 of the embodiment was produced so that the tilt angle θ of the liquid crystal molecules was 5°, the phase difference due to the tilt of the liquid crystal molecules is 27 nm. Therefore, a material having a phase difference of 27 nm was used as the phase difference plate 4. In the embodiment, Artonfilm (product name: made by JSR Kabushiki Kaisha) containing norbornene resin as a major constituent was used as the phase difference plate 4.

Furthermore, by arranging the two polarizers 2 and 3 so that the liquid crystal cell 1 and the phase difference plate 4 are sandwiched therebetween, and combining the light source 5, the projection lens 6, members of driving and optical systems (not shown), the liquid crystal display apparatus was completed. In the embodiment, an angle formed by the polarizing axis of each of the polarizers 2 and 3, and the orientation direction of the substrate of the liquid crystal cell 1 adjacent to one of the polarizers is set to be 45°.

Between the liquid crystal display apparatus of the embodiment thus produced and a liquid crystal display apparatus structured in the same manner with the exception that the phase difference plate 4 is not provided, a comparison of the light-transmittances in the normal direction of the substrate of the liquid crystal cell at the time of non-select voltage application was made. As a result, the light-transmittance of the liquid crystal display apparatus of the embodiment was restricted to about one-sixtieth of that of the liquid crystal display apparatus without the phase difference plate.

Further, proper electric signals were applied to the electrodes to drive the liquid crystal molecules, and black/white contrasts in the normal direction of the substrate of the liquid crystal cell are compared. As a result, while the liquid crystal display apparatus without the phase difference plate had a contrast of 50, a high contrast of 2500 was obtained in the liquid crystal display apparatus of the embodiment.

Although a single phase difference plate was used in the embodiment, a plurality of phase difference plates of the same kind or another kind may be used. Further, the plates may be arranged on both sides of the liquid crystal cell 1. In any case, it is necessary to match the phase difference due to the tilt of the liquid crystal molecules at the time of non-select voltage application, with the phase difference of the phase difference plate, as possible.

What is mentioned by the term of "match" in this case is to match not only a value of both the phase differences but also a preset angle. In other words, when the phase difference due to the tilt of the liquid crystal cell at the time of non-select voltage application, the phase difference of the phase difference plate, and an angle formed by the phase axis of the phase difference plate and the orientation direction of the substrate of the liquid crystal cell 1 adjacent to the phase difference plate are denoted by $R_{LC}$, $R_{RE}$, and $\phi$, respectively, $R_{LC}$ and $R_{RE} \times \sin^2\phi$ are matched with each other, as possible. In the embodiment, since the phase difference $R_{LC}$ due to the tilt of the liquid crystal molecules at the time of non-select voltage application is almost equal to the phase difference $R_{RE}$ of the phase difference plate, the angle $\phi$ formed by the phase axis of the phase difference plate and the orientation direction of the substrate of the liquid crystal cell 1 adjacent to the phase difference plate was set to be about 90°.

Even in the case of $R_{LC} < R_{RE}$, both of the phase differences can be matched with each other by adjusting the angle $\phi$. However, since the margin of the angle $\phi$ is reduced when the ratio of $R_{RE}$ to $R_{LC}$ is too large, it is desirable to restrict $R_{RE}$ to four times $R_{LC}$ or less.

(Second Embodiment)

Although the liquid crystal display apparatus of transmission-type is illustrated in the first embodiment, a liquid crystal display apparatus of reflection-type will be explained in a second embodiment.

Figure 3:
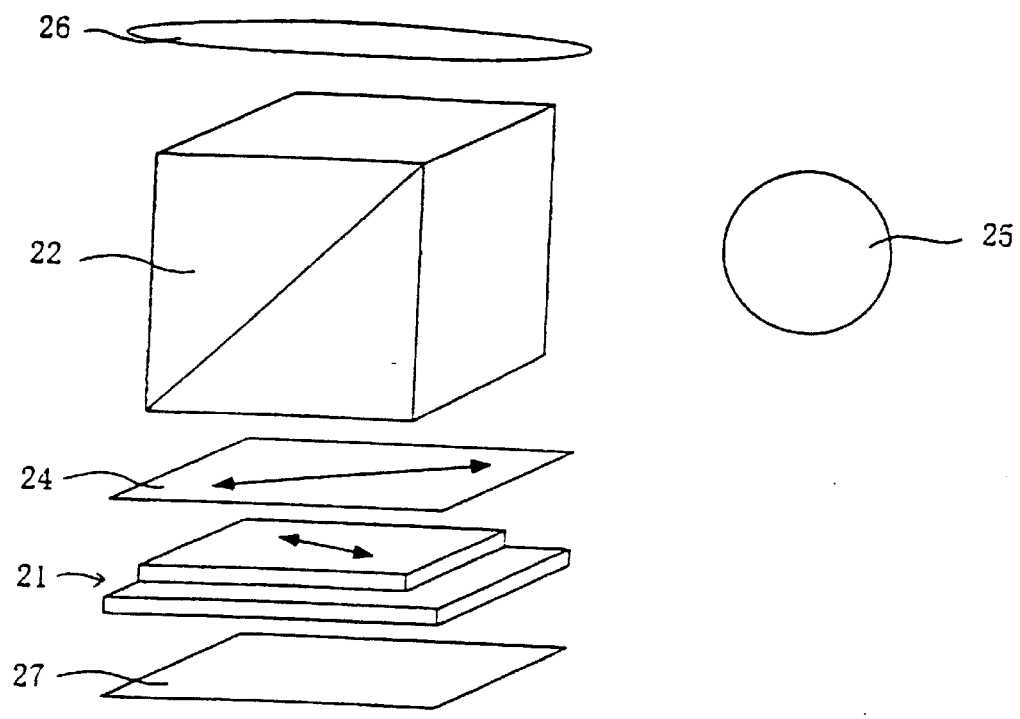
FIG. 3 is a perspective view showing a schematic structure of a liquid crystal display apparatus of another embodiment according to the invention.
Figure 4:
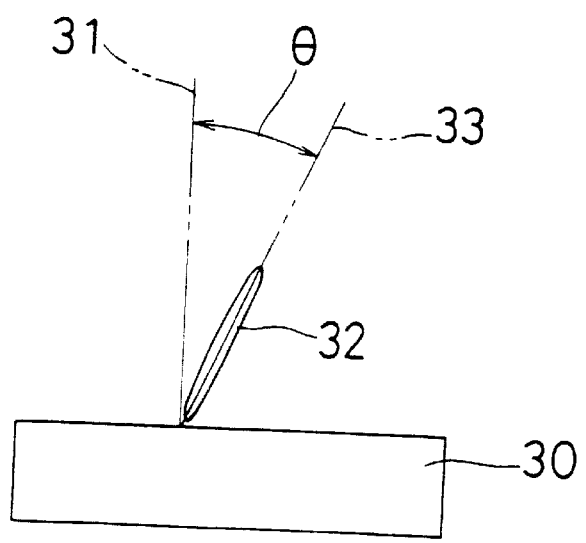
FIG. 4 is a view showing a tilt angle θ formed by a normal direction 31 of a substrate and a major axial direction 33 of a liquid crystal molecule.

FIG. 3 is a schematic view showing a structure of the liquid crystal display apparatus of the embodiment, wherein the apparatus comprises: a liquid crystal cell 21 in which N-type liquid crystal is injected between two electrode substrates and a perpendicular orientation film is formed on an inner face of the electrode substrate; a polarizing beam splitter 22; a phase difference plate 24 arranged to be adjacent to the liquid crystal cell 21 and between the cell and the polarizing beam splitter 22; a light source 25; a reflecting plate 27 disposed on a side opposite to the phase difference plate 24 side of the liquid crystal cell 21; and a projection lens 26 disposed on a side opposite to the phase difference plate 24 side of the polarizing beam splitter 22.

The liquid crystal cell 21 in the embodiment is structured in the same manner as the liquid crystal cell 1 of the first embodiment, with the exception that the plastic bead has a particle size of 2 μm. Therefore, the explanation for the structure thereof is omitted.

In the embodiment, the phase difference $R_{RE}$ due to the tilt of the liquid crystal molecules at the time of non-select voltage application was about 13.5 nm, so that a material with a phase difference of 13.5 nm was used for the phase difference plate 24. In the embodiment, Artonfilm (product name; made by JSR Kabushiki Kaisha) containing norbornene resin as a major constituent was used for the phase difference plate 24.

With respect to the liquid crystal display apparatus of the embodiment and a liquid crystal display apparatus having the same structure as that of the embodiment with the exception that the phase difference plate 24 is not provided, light-transmittance at the time of non-select voltage application was compared with each other. As a result, in the liquid crystal display apparatus of the embodiment, the light-transmittance was restricted to about one-tenth of that of the liquid crystal display apparatus without the phase difference plate.

Further, proper electric signals were applied to the electrodes to drive the liquid crystal, so that black/white contrasts in the normal direction of the substrate of the liquid crystal cell were compared. As a result, while the contrast was 40 in the liquid crystal display apparatus without the phase difference plate, the high contrast of 350 was obtained in the liquid crystal display apparatus of the embodiment.

Although a single phase difference plate was used in the embodiment, a plurality of phase difference plates of the same kind or another kind may be used, as well as in the first embodiment. Further, the plates may be arranged on both sides of the liquid crystal cell 21. In any case, as well as in the first embodiment, it is necessary to match the phase difference due to the tilt of the liquid crystal molecules at the time of non-select voltage application, with the phase difference of the phase difference plate, as possible.

(Third Embodiment)

Although the reflecting plate 27 is placed on the rear face of the liquid crystal cell 21 in the second embodiment, this reflecting plate 27 may be omitted and the pixel electrode may be formed in the liquid crystal cell 21 by a metal of high reflectivity such as Al and Ag. The liquid crystal display apparatus of a third embodiment will be illustrated below.

A part up to the contact hole on the drain electrode is formed in the same manner as in the first embodiment, and Al is used to form the reflecting electrode in place of the ITO electrode. Subsequent processes are given in the same manner as in the first embodiment, with the exception that a particle size of the plastic beads is 2 μm, to produce the liquid crystal cell. The phase difference of this liquid crystal cell due to the tilt of the liquid crystal molecules at the time of non-select voltage application is 13.5 nm, which is the same as that in the second embodiment.

The phase difference plate having a phase difference of 13.5 nm is bonded to this liquid crystal cell, and integrated into the optical system using the polarizing beam splitter in the same manner as in the second embodiment, whereby the liquid crystal display apparatus of the embodiment is produced.

With respect to the liquid crystal display apparatus of the embodiment and a liquid crystal display apparatus having the same structure as that of the embodiment with the exception that the phase difference plate 24 is not provided, light-transmittances at the time of non-select voltage application were compared with each other. As a result, in the liquid crystal display apparatus of the embodiment, the light-transmittance was restricted to about one-tenth of that of the liquid crystal display apparatus without the phase difference plate.

Further, proper electric signals were applied to the electrodes to drive the liquid crystal molecules to compare black/white contrasts in the normal direction of the substrate of the liquid crystal cell. As a result, while the contrast was 40 in the liquid crystal display apparatus without the phase difference, a high contrast of 350 was obtained in the liquid crystal display apparatus of the embodiment.

Although a single phase difference plate was used in the embodiment, a plurality of phase difference plates of the same kind or another kind may be used, as well as in the first embodiment. Further, the plates may be arranged on both sides of the liquid crystal cell. In any case, as well as in the first embodiment, it is necessary to match the phase difference due to the tilt of the liquid crystal molecules at the time of non-select voltage application, with the phase difference of the phase difference plate, as possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
   at least a liquid crystal cell in which liquid crystal molecules having a negative dielectric constant anisotropy are sandwiched between two electric substrates which confront each other and each have a perpendicular orientation film on a surface thereof,
   wherein a major axial direction of the liquid crystal molecules in a state on non-select voltage application between the electrodes being tilted away from a normal direction of the electrode substrate,
   a phase difference plate for compensating a phase difference generated due to the tilt of the liquid crystal molecules being disposed adjacent to the liquid crystal cell, and
   wherein a phase difference of the phase difference plate is set so as to be four or less times the phase difference generated due to the tilt of the liquid crystal molecules.

2. The liquid crystal display apparatus of claim 1, wherein a phase difference of the phase difference plate is set to be one to four times the phase difference generated due to the tilt of the liquid crystal molecules.

3. The liquid crystal display apparatus of claim 1, wherein a tilt angle θ formed by the major axial direction of the liquid crystal molecules in the state of non-select voltage application between the electrodes and the normal direction of the electrode substrates is set to be in a range of 1° to 15°.

4. The liquid crystal display apparatus of claim 1, wherein the phase difference plate is made of norbornene resin.

5. A liquid crystal display apparatus comprising.
   a liquid crystal cell in which liquid crystal molecules having a negative dielectric constant anisotropy are sandwiched between two electric substrates which confront each other and each have a perpendicular orientation film on a surface thereof;
   wherein a major axial direction of the liquid crystal molecules in a state on non-select voltage application between the electrodes being tilted away from a normal direction of the electrode substrate, where a tilt angle θ formed by the major axial direction of the liquid crystal molecules and the normal direction of the electrode substrates is set to be in a range of from 1° to 15°;
   a phase difference plate, made of norbornene resin, for compensating a phase difference generated due to the tilt of the liquid crystal molecules being disposed adjacent to the liquid crystal cell; and
   wherein a phase difference of the phase difference plate is set to be one to four times the phase difference generated due to the tilt of the liquid crystal molecules.

6. A liquid crystal display apparatus comprising:
   a liquid crystal cell having a thickness of 4 $\mu$m and in which liquid crystal molecules having a negative dielectric constant anisotropy are sandwiched between two electric substrates which confront each other and each have a perpendicular orientation film on a surface thereof;
   wherein a major axial direction of the liquid crystal molecules, in a state on non-select voltage application between the electrodes, being tilted away from a normal direction of the electrode substrate;
   wherein the liquid crystal molecules have a refractive index anisotropy of 0.0756 and a tilt angle of 5°;
   a first and second polarizers each having a polarizing axis and being arranged so the polarizing axes thereof are at an angle with respect to each other;
   a phase difference plate for compensating a phase difference generated due to the tilt of the liquid crystal molecules being disposed adjacent to the liquid crystal cell, the phase difference of the phase difference plate being 27 nm; and
   the first polarizer, the liquid crystal cell, the phase difference plate and the second polarizer being arranged in this order.

7. A liquid crystal display apparatus comprising:
   a liquid crystal cell having a thickness of 2 $\mu$m and in which liquid crystal molecules having a negative dielectric constant anisotropy are sandwiched between two electric substrates which confront each other and each have a perpendicular orientation film on a surface thereof;
   wherein a major axial direction of the liquid crystal molecules, in a state on non-select voltage application between the electrodes, being tilted away from a normal direction of the electrode substrate;
   wherein the liquid crystal molecules have a refractive index anisotropy of 0.0756 and a tilt angle of 5°;
   a polarizing beam splitter;
   a reflecting plate;
   a phase difference plate for compensating a phase difference generated due to the tilt of the liquid crystal molecules being disposed adjacent to the liquid crystal cell, the phase difference of the phase difference plate being 13.5 nm; and
   the reflecting plate, the liquid crystal cell, the phase difference plate and the polarizing beam splitter being arranged in this order.

8. A liquid crystal display apparatus comprising:
   a liquid crystal cell having a thickness of 2 $\mu$m and in which liquid crystal molecules having a negative dielectric constant anisotropy are sandwiched between two electric substrates which confront each other and each have a perpendicular orientation film on a surface thereof;
   wherein a major axial direction of the liquid crystal molecules, in a state on non-select voltage application between the electrodes, being tilted away from a normal direction of the electrode substrate;
   wherein the liquid crystal molecules have a refractive index anisotropy of 0.0756 and a tilt angle of 5°;
   a polarizing beam splitter;
   a phase difference plate for compensating a phase difference generated due to the tilt of the liquid crystal molecules and being disposed adjacent to the liquid crystal cell and between the polarizing beam splitter and liquid crystal cell;
   wherein the phase difference of the phase difference plate is 13.5 nm; and
   wherein one of the two electric substrates, the electric substrate on a side of the liquid crystal cell opposite to the phase difference plate, is arranged so as to form a reflecting electrode.

* * * * *